(12) United States Patent
Ponnaluri et al.

(10) Patent No.: US 7,639,515 B2
(45) Date of Patent: Dec. 29, 2009

(54) SWITCHGEAR CELL AND CONVERTER CIRCUIT FOR SWITCHING A LARGE NUMBER OF VOLTAGE LEVELS

(75) Inventors: Srinivas Ponnaluri, Untersiggenthal (CH); Christoph Häderli, Zürich (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/222,042

(22) Filed: Jul. 31, 2008

(65) Prior Publication Data

US 2008/0315859 A1 Dec. 25, 2008

Related U.S. Application Data

(63) Continuation of application No. PCT/CH2006/000699, filed on Dec. 14, 2006.

(30) Foreign Application Priority Data

Feb. 1, 2006 (EP) ................... 06405047

(51) Int. Cl.
*H02M 3/24* (2006.01)
*H02M 5/42* (2006.01)
*H02M 7/44* (2006.01)

(52) U.S. Cl. .................. 363/17; 363/98; 363/131; 363/132

(58) Field of Classification Search .......... 363/17, 363/95, 98, 131, 132
See application file for complete search history.

(56) References Cited

U.S. PATENT DOCUMENTS 3,962,629 A * 6/1976 Martyashin et al. ......... 324/649

5,493,134 A 2/1996 Mehrotra et al.
6,960,843 B2 * 11/2005 Yamamoto .................. 307/86

FOREIGN PATENT DOCUMENTS

DE 100 61 589 C1 7/2002
WO WO 03/017457 A1 2/2003

OTHER PUBLICATIONS

PCT/ISA/210 and PCT/ISA/237.
"Soft-Switched Three-Level Capacitor Clamping Inverter with Clamping Voltage Stabilization", IEEE Transactions on Industry Applications, vol. 36, No. 4, Jul./Aug. 2000.
"A Generalized Multilevel Inverter Topology with Self Voltage Balancing", IEEE Transactions on Industry Applications, vol. 37, No. 2, Mar./Apr. 2001.

(Continued)

*Primary Examiner*—Bao Q Vu
(74) *Attorney, Agent, or Firm*—Buchanan Ingersoll & Rooney PC

(57) ABSTRACT

A switchgear cell is disclosed having a first energy store and a second energy store connected in series therewith, having a first, second, third and fourth power semiconductor switch, which are connected in series, wherein the first, second, third and fourth power semiconductor switch are in each case one drivable bidirectional power semiconductor switch with a controlled unidirectional current-conducting direction. The first power semiconductor switch is connected to the first energy store, and the fourth power semiconductor switch is connected to the second energy store. A third energy store is connected to the junction between the first and the second power semiconductor switch and the junction between the third and the fourth power semiconductor switch.

22 Claims, 11 Drawing Sheets

OTHER PUBLICATIONS

EPA Forms 1703 and 1507 with EPO Search Report.
Notification of Transmittal of Copies of Translation of the International Preliminary Report on Patentability and Written Opinion of the International Searching Authority issued in corresponding International Patent Application No. PCT/CH2006/000699 dated Sep. 18, 2008, The International Bureau of WIPO, Geneva, Switzerland.

* cited by examiner

US 7,639,515 B2

SWITCHGEAR CELL AND CONVERTER CIRCUIT FOR SWITCHING A LARGE NUMBER OF VOLTAGE LEVELS

RELATED APPLICATIONS

This application claims priority under 35 U.S.C. §119 to European Application 06405047.9 filed in Europe on Feb. 1, 2006, and as a continuation application under 35 U.S.C. §120 to PCT/CH2006/000699 filed as an International Application on Dec. 14, 2006 designating the U.S., the entire contents of which are hereby incorporated by reference in their entireties.

TECHNICAL FIELD

The disclosure relates to the field of converter circuits. It is based on a switchgear cell and on a converter circuit for switching a large number of voltage levels.

BACKGROUND INFORMATION

At the present time power semiconductor switches are being used increasingly in converter technology and in particular in converter circuits for switching a large number of voltage levels. Such a converter circuit for switching a large number of voltage levels is specified in "A Generalized Multilevel Inverter Topology with Self Voltage Balancing", IEEE Transactions on Industry Applications, Vol. 37, No. 2, March/April 2001, wherein a switchgear cell having a first energy store and a second energy store connected in series with the first energy store is specified in FIG. 1 with respect to the converter circuit for switching for example three voltage levels. Furthermore, the switchgear cell has a first, second, third and fourth power semiconductor switch, wherein the first, second, third and fourth power semiconductor switch are in each case a drivable bidirectional power semiconductor switch with a controlled unidirectional current-carrying direction and the first, second, third and fourth power semiconductor switch are connected in series and the first power semiconductor switch is connected to the first energy store and the fourth power semiconductor switch is connected to the second energy store. The junction point between the second power semiconductor switch and the third power semiconductor switch is connected, in particular directly, to the junction point between the first energy store and the second energy store. Furthermore, a third energy store is connected to the junction point between the first power semiconductor switch and the second power semiconductor switch and to the junction point between the third power semiconductor switch and the fourth power semiconductor switch.

What is problematic in the case of a converter circuit on the basis of a switchgear cell according to "A Generalized Multilevel Inverter Topology with Self Voltage Balancing", IEEE Transactions on Industry Applications, Vol. 37, No. 2, March/April 2001, is that, in the case of a for example desired higher number of voltage levels to be switched, such as five or seven voltage levels, for example, the number of power semiconductor switches required and the number of energy stores required increase significantly, as shown in FIG. 1 according to "A Generalized Multilevel Inverter Topology with Self Voltage Balancing", IEEE Transactions on Industry Applications, Vol. 37, No. 2, March/April 2001. This is accompanied by a very high circuitry outlay and, with regard to the power semiconductor switches, also a very high driving outlay, which typically results in an increased susceptibility to interference and hence low availability. Moreover, such a converter circuit requires a large amount of space.

"Soft-Switched Three-Level Capacitor Clamping Inverter with Clamping Voltage Stabilization", IEEE Transactions on Industry Applications, Vol. 36, No. 4, July/August 2000, also discloses a switchgear cell having a first energy store and a second energy store connected in series with the first energy store and having a first, second, third and fourth power semiconductor switch, wherein the first, second, third and fourth power semiconductor switch are in each case a drivable bidirectional power semiconductor switch with a controlled unidirectional current-carrying direction and the first, second, third and fourth power semiconductor switch are connected in series and the first power semiconductor switch is connected to the first energy store and the fourth power semiconductor switch is connected to the second energy store. Furthermore, a third energy store is provided, which is connected to the junction point between the first power semiconductor switch and the second power semiconductor switch and to the junction point between the third power semiconductor switch and the fourth power semiconductor switch. Furthermore, a switching element with a controlled bidirectional current-carrying direction is provided, which is connected via a first inductance and a first transformer to the junction point between the second and the third power semiconductor switch and which is connected via a second inductance and a second transformer to the junction point between the first energy store and the second energy store.

SUMMARY

A switchgear cell is disclosed with which it is possible to realize a simple and robust converter circuit for switching a large number of voltage levels with a small number of components, which additionally manages with a small space requirement. Furthermore, the intention is to specify such a converter circuit.

A switchgear cell is disclosed having a first energy store and a second energy store connected in series therewith, having a first, second, third and fourth power semiconductor switch, wherein the first, second, third and fourth power semiconductor switch are in each case a drivable bidirectional power semiconductor switch with a controlled unidirectional current-carrying direction and the first, second, third and fourth power semiconductor switch are connected in series and the first power semiconductor switch is connected to the first energy store and the fourth power semiconductor switch is connected to the second energy store, having a third energy store, which is connected to the junction point between the first power semiconductor switch and the second power semiconductor switch and to the junction point between the third power semiconductor switch and the fourth power semiconductor switch, wherein a switching element with a controlled bidirectional current-carrying direction is connected directly to the junction point between the second and the third power semiconductor switch and directly to the junction point between the first energy store and the second energy store.

In another aspect, a converter circuit arrangement is disclosed for switching a large number of voltage levels comprising: a first power semiconductor switch; a second power semiconductor switch connected in series with the first power semiconductor switch; a third power semiconductor switch; a fourth power semiconductor switch; and a switchgear cell connected to the first power semiconductor switch of the converter circuit and to the second power semiconductor switch of the converter circuit, the switchgear cell having a first energy store and a second energy store connected in series therewith. The first, second, third and fourth power semiconductor switch are in each case a drivable bidirectional power semiconductor switch with a controlled unidirectional current-carrying direction and the first, second, third and fourth power semiconductor switch are connected in series and the first power semiconductor switch is connected to the first energy store and the fourth power semiconductor switch is connected to the second energy store. A third energy store is connected to the junction point between the first power semiconductor switch and the second power semiconductor switch and to the junction point between the third power semiconductor switch and the fourth power semiconductor switch.

These and further objects, advantages and features of the present disclosure will become apparent from the following detailed description of exemplary embodiments of the disclosure in conjunction with the drawings.

Figure 1:
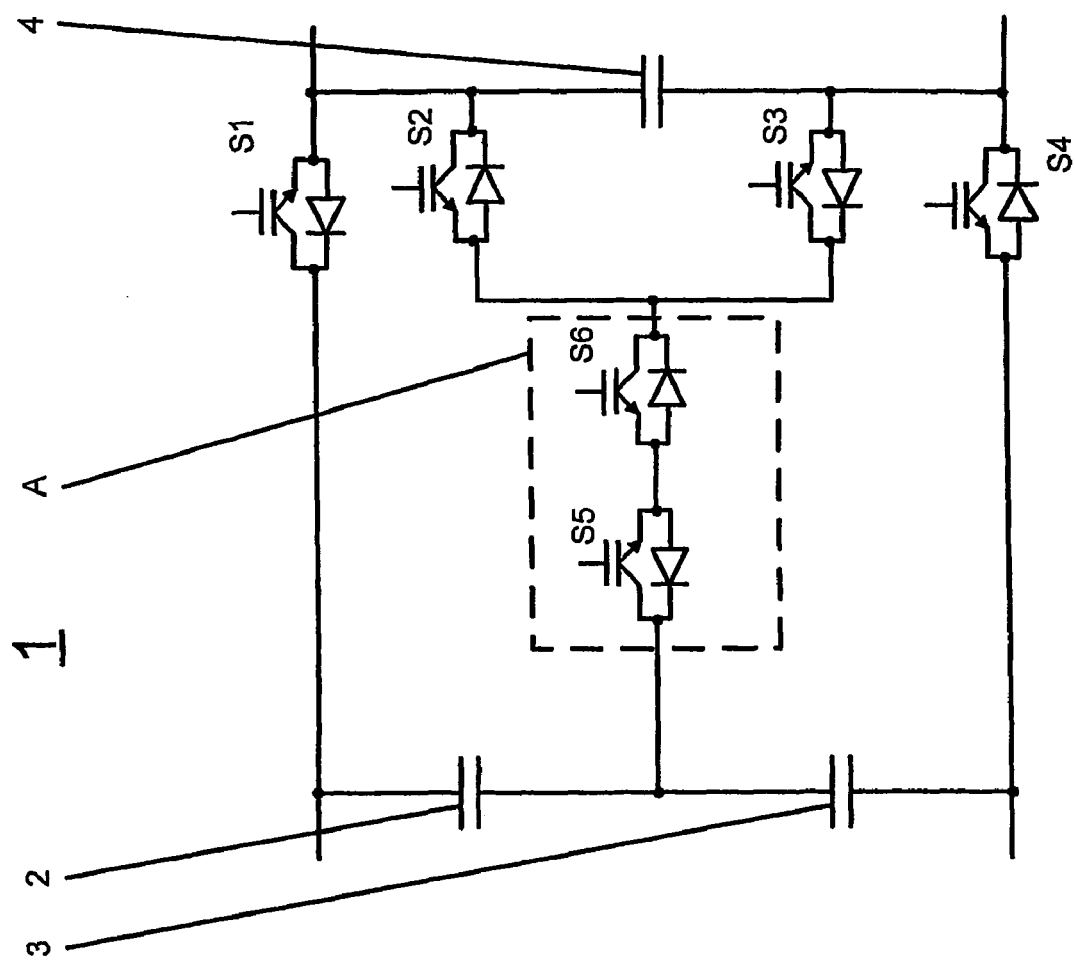
FIG. 1 shows a first exemplary embodiment of a switchgear cell according to the disclosure.

The reference symbols used in the drawing and their meanings are listed in summary in the List of Reference Symbols. In principle, identical parts are provided with identical reference symbols in the figures. The embodiments described represent examples of the subject matter of the disclosure and have no restrictive effect.

DETAILED DESCRIPTION

The switchgear cell, according to the disclosure for switching a large number of voltage levels has a first energy store and a second energy store connected in series with the first energy store. Furthermore, the switchgear cell has a first, second, third and fourth power semiconductor switch, wherein the first, second, third and fourth power semiconductor switch are in each case a drivable bidirectional power semiconductor switch with a controlled unidirectional current-carrying direction and the first, second, third and fourth power semiconductor switch are connected in series and the first power semiconductor switch is connected to the first energy store and the fourth power semiconductor switch is connected to the second energy store. Furthermore, a third energy store is connected to the junction point between the first power semiconductor switch and the second power semiconductor switch and to the junction point between the third power semiconductor switch and the fourth power semiconductor switch. According to the disclosure, a switching element with a controlled bidirectional current-carrying direction is now connected directly to the junction point between the second and the third power semiconductor switch and directly to the junction point between the first energy store and the second energy store. It is thus advantageously possible to set or regulate the current at the junction point between the first energy store and the second energy store in a bidirectional direction. Moreover, by means of the switchgear cell according to the disclosure it is possible to realize a converter circuit which, in conjunction with power semiconductor switches of the converter circuit, switches for example five and seven voltage levels without the number of switching elements of the converter circuit that are to be driven having to be significantly increased overall. Furthermore, the number of energy stores advantageously remains unchanged. The circuitry outlay of such a converter circuit can accordingly be kept low with the switchgear cell according to the invention, wherein the driving outlay with regard to the switching elements can additionally likewise be kept low. This means that such a converter circuit with the switchgear cell according to the invention is constructed very simply overall, is not very susceptible to interference and requires a minimum of space.

Figure 2:
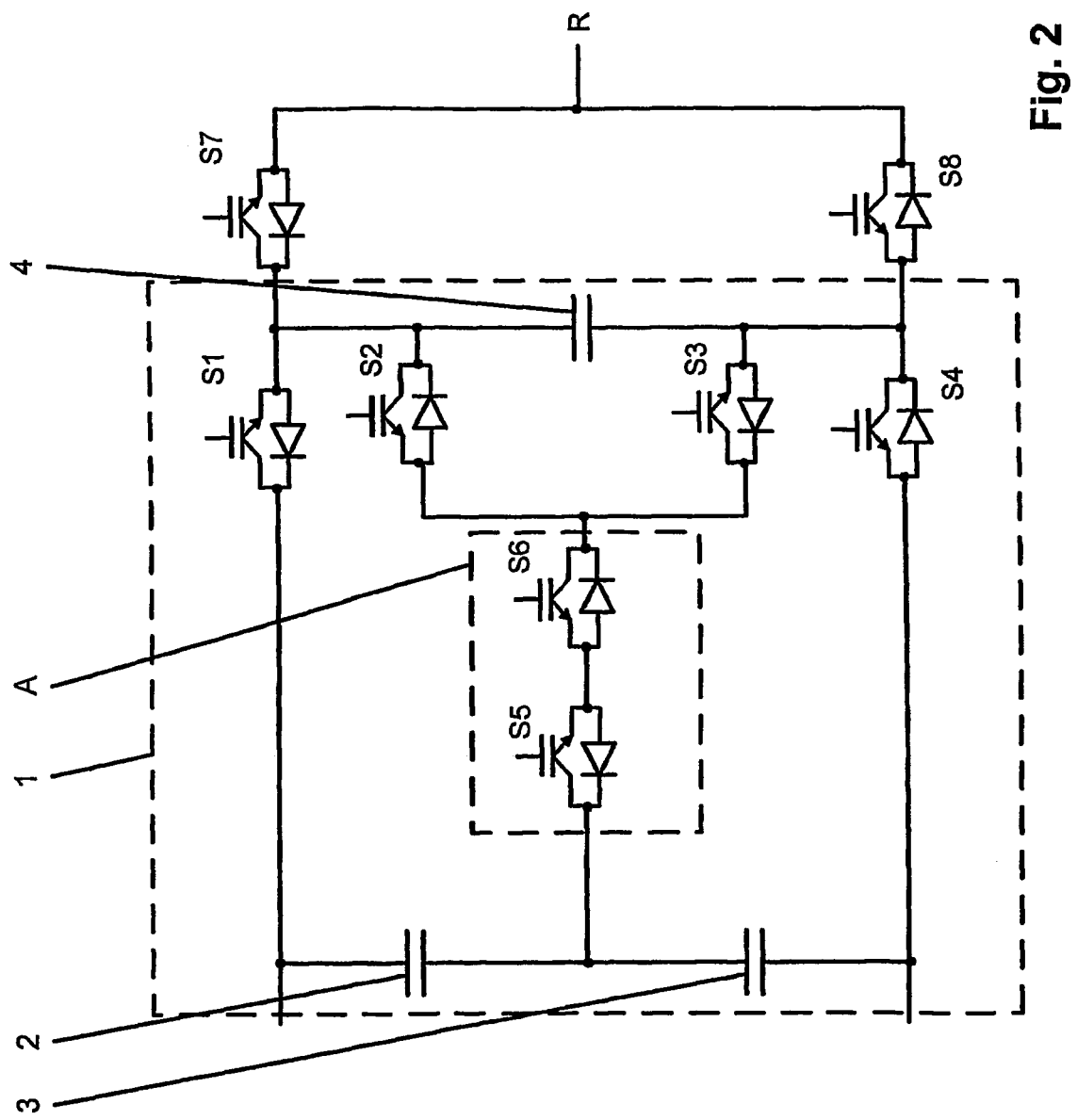
FIG. 2 shows a first exemplary embodiment of a converter circuit according to the disclosure for switching a large number of voltage levels with a switchgear cell according to FIG. 1.

FIG. 1 illustrates a first exemplary embodiment of a switchgear cell 1 according to the disclosure. Furthermore, FIG. 2 shows a first exemplary embodiment of a converter circuit according to the disclosure for switching a large number of voltage levels with a switchgear cell according to FIG. 1. In accordance with FIG. 2, the converter circuit for switching a large number of voltage levels has a first power semiconductor switch S7 and a second power semiconductor switch S8 connected in series with the first power semiconductor switch S7. In accordance with FIG. 2, the junction point between the first power semiconductor switch S7 and the second power semiconductor switch S8 then forms a phase connection, illustrated by way of example for the phase R. In accordance with FIG. 1 and FIG. 2, the switchgear cell 1 has a first energy store 2 and a second energy store 3 connected in series with the first energy store 2. Furthermore, the switchgear cell 1 has a first, second, third and fourth power semiconductor switch S1, S2, S3, S4, wherein the first, second, third and fourth power semiconductor switch S1, S2, S3, S4 are in each case a drivable bidirectional power semiconductor switch with a controlled unidirectional current-carrying direction. In accordance with FIG. 1, each of the first, second, third and fourth power semiconductor switches S1, S2, S3, S4 of the switchgear cell 1, which are in each case embodied as a drivable bidirectional power semiconductor switch with a controlled unidirectional current-carrying direction is formed by way of example by an insulated gate bipolar transistor (IGBT), and by a diode connected in antiparallel with the bipolar transistor. However, it is also conceivable to embody an abovementioned drivable bidirectional power semiconductor switch for example as a power MOSFET with, in addition, an antiparallel-connected diode. In accordance with the converter circuit according to FIG. 2, the first and second power semiconductor switch S7, S8 of the converter circuit are in each case a drivable bidirectional power semiconductor switch with a controlled unidirectional current-carrying direction. In this case, each of the first and second power semiconductor switches S7, S8, which are in each case embodied as a drivable bidirectional power semiconductor switch with a controlled unidirectional current-carrying direction, in accordance with FIG. 2 is formed by way of example by an insulated gate bipolar transistor (IGBT) and by a diode connected in antiparallel with the bipolar transistor. However, it is also conceivable to embody an abovementioned drivable bidirectional power semiconductor switch for example as a power MOSFET with, in addition, an antiparallel-connected diode.

In accordance with FIG. 1 and FIG. 2, the first, second, third and fourth power semiconductor switch S1, S2, S3, S4 of the switchgear cell 1 are connected in series and the first power semiconductor switch S1 is connected to the first energy store 2 and the fourth power semiconductor switch S4 is connected to the second energy store 3. Furthermore, a third energy store 4 is connected to the junction point between the first power semiconductor switch S1 and the second power semiconductor switch S2 and to the junction point between the third power semiconductor switch S3 and the fourth power semiconductor switch S4.

According to the disclosure, a switching element with a controlled unbidirectional current-carrying direction A is connected directly to the junction point between the second and the third power semiconductor switch S2, S3 and directly to the junction point between the first energy store 2 and the second energy store 3. It is thus advantageously possible to set or regulate the current at the junction point between the first energy store 2 and the second energy store 3 in a bidirectional direction. Moreover, by means of the switchgear cell 1 according to the disclosure it is possible to realize a converter circuit which, in conjunction with power semiconductor switches of the converter circuit, switches for example five and seven voltage levels without the number of switching elements of the converter circuit that are to be driven having to be significantly increased overall. Furthermore, the number of energy stores 2, 3, 4 advantageously remains unchanged. The circuitry outlay of such a converter circuit can accordingly be kept low with the switchgear cell 1 according to the disclosure, wherein the driving outlay with regard to the switching elements can additionally likewise be kept low. This means that such a converter circuit with the switchgear cell 1 according to the disclosure is constructed very simply overall, is not very susceptible to interference and requires a minimum of space.

As shown in the exemplary embodiment of the converter circuit according to the disclosure in FIG. 2 by way of example, but also in FIG. 3 to FIG. 8a, which embodiments will be described in detail below, the switchgear cell 1 is generally connected to the first power semiconductor switch S7 of the converter circuit and to the second power semiconductor switch S8 of the converter circuit. In connection with the switchgear cell 1 according to the disclosure, in particular in accordance with FIG. 2 to FIG. 8a, a converter circuit is realized which can switch for example five and seven voltage levels without the number of switching elements of the converter circuit that are to be driven having to be significantly increased overall. If only five voltage levels are switched by means of the converter circuit, the number of redundant switching state combinations with respect to a voltage level advantageously increases, that is to say that for example the same voltage level at the phase connection can be set by means of a plurality of switching state combinations of the power semiconductor switches S7, S8 of the converter circuit, the first, second, third and fourth power semiconductor switches S1, S2, S3, S4 of the switchgear cell 1 and of the switching element A. As a result, it is possible for example to achieve a more uniform capacity utilization of the switching elements of the converter circuit that are to be driven and the third energy store 4 can be designed to be small since the third energy store 4 can be both charged and discharged by means of the redundant switching state combinations. The circuitry outlay for a converter circuit of this type can additionally advantageously be kept small with the switchgear cell 1 according to the disclosure, wherein the driving outlay with regard to the switching elements to be driven can additionally likewise be kept low. This means that such a converter circuit according to the disclosure with the switchgear cell 1 according to the disclosure is constructed very simply overall, is robust and requires only little space.

In accordance with FIG. 2 to FIG. 8a, in the converter circuit according to the disclosure, in general, the first power semiconductor switch S7 of the converter circuit in connected to the junction point between the first power semiconductor switch S1 of the switchgear cell 1 and the second power semiconductor switch S2 of the switchgear cell 1 and the second power semiconductor switch S8 of the converter circuit is connected to the junction point between the third power semiconductor switch S3 of the switchgear cell 1 and the fourth power semiconductor switch S4 of the switchgear cell 1. As a result, the converter circuit according to the disclosure is realized extremely simply, is therefore not very susceptible to interference and saves space.

Figure 2A:
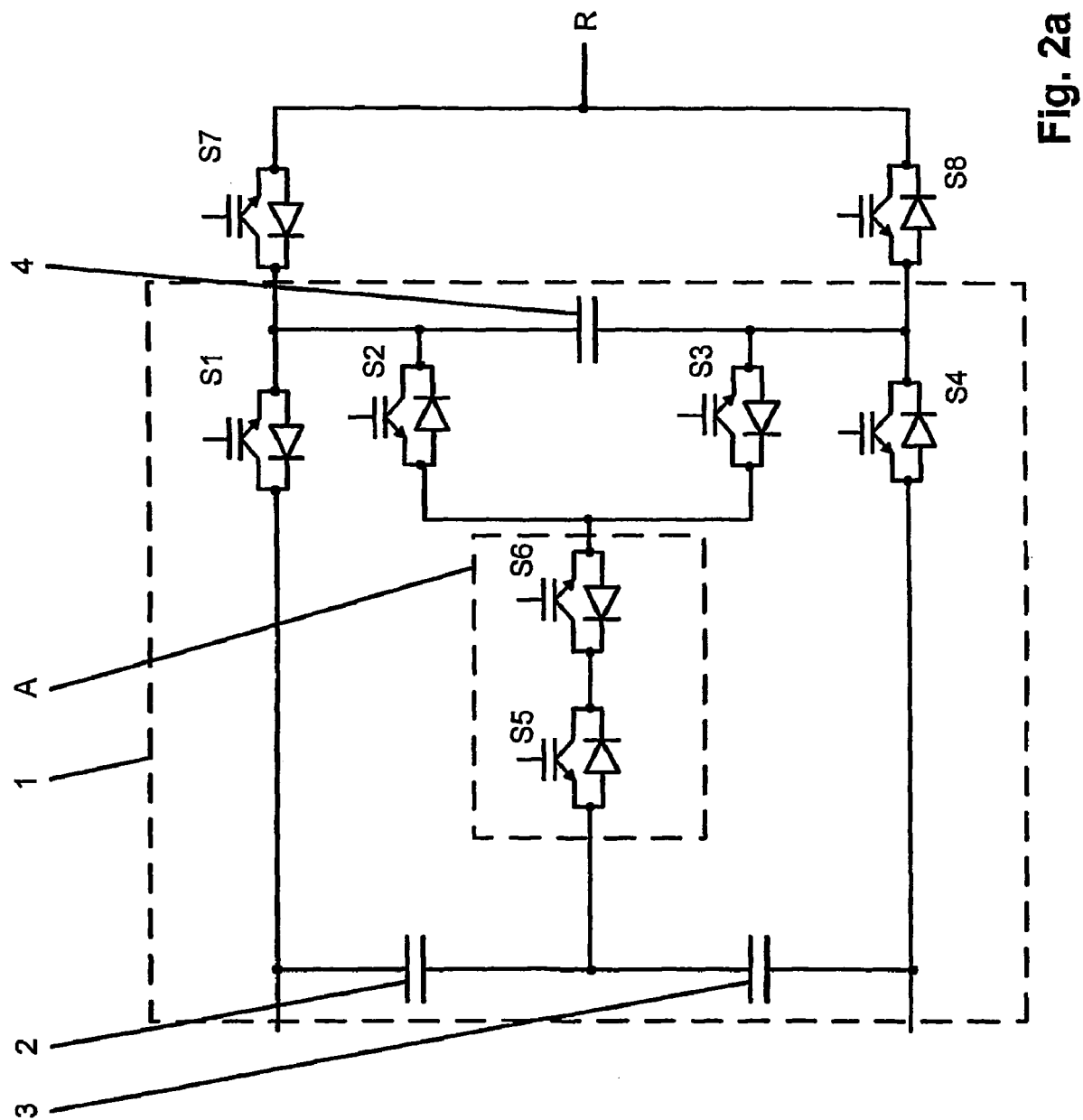
FIG. 2a shows a second exemplary embodiment of the converter circuit according to the disclosure for switching a large number of voltage levels with a second exemplary embodiment of the switchgear cell according to the disclosure.

In accordance with FIG. 1 and FIG. 2, the switching element with a controlled bidirectional current-carrying direction A of the switchgear cell 1 has two antiseries-connected drivable bidirectional power semiconductor switches with a controlled unidirectional current-carrying direction S5, S6. The drivable bidirectional power semiconductor switches with a controlled unidirectional current-carrying direction S5, S6 can in each case be embodied in accordance with the power semiconductor switches S1, S2, S3, S4, S7, S8, as mentioned above. In the case of the antiseries connection of the drivable bidirectional power semiconductor switches with a controlled unidirectional current-carrying direction S5, S6, there are two possibilities, then: namely either in accordance with FIG. 1 and FIG. 2 or in accordance with a second exemplary embodiment of the converter circuit according to the disclosure for switching-a large number of voltage levels with a second exemplary embodiment of a switchgear cell 1 according to the disclosure according to FIG. 2a.

Figure 3:
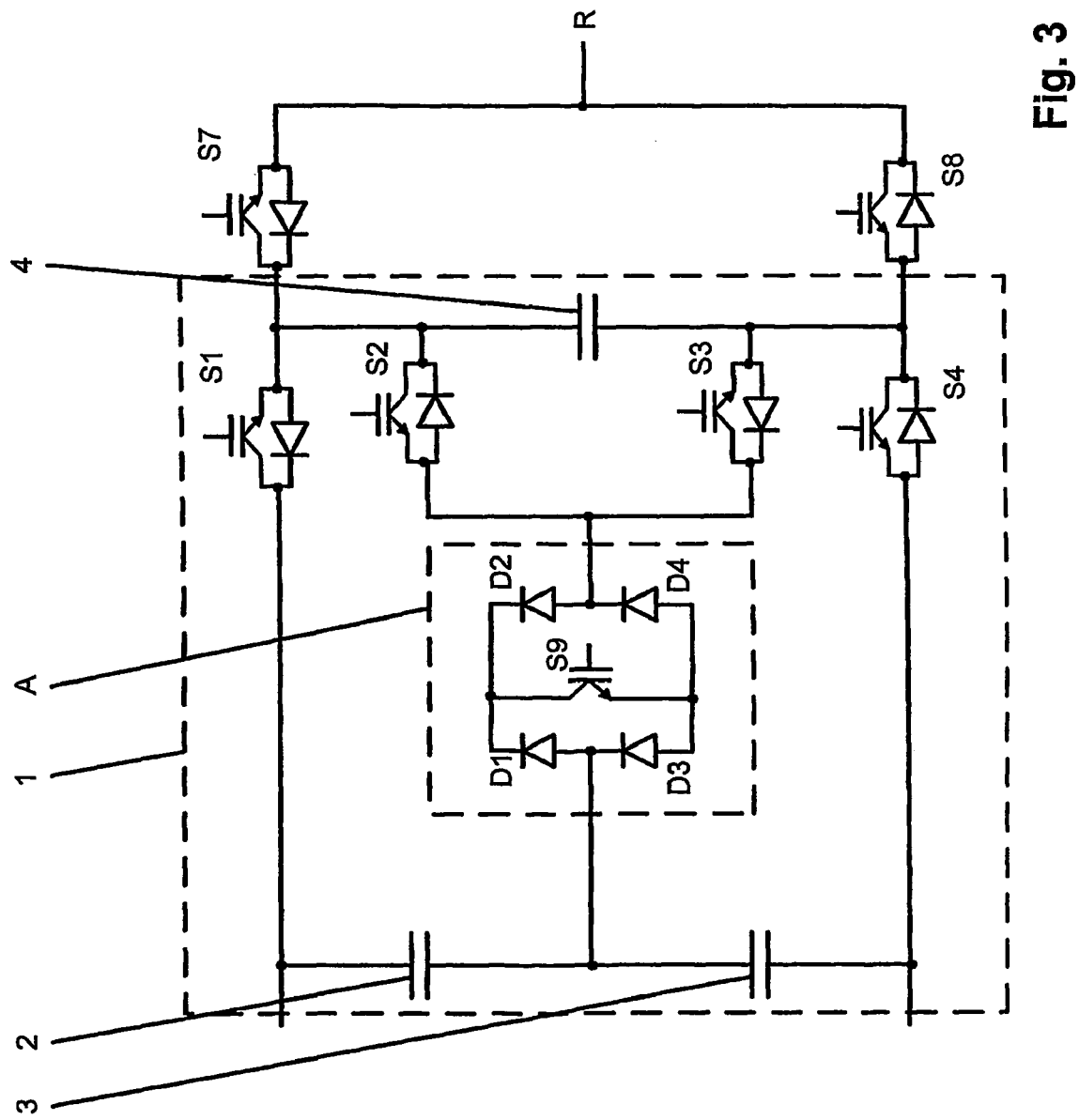
FIG. 3 shows a third exemplary embodiment of the converter circuit according to the disclosure for switching a large number of voltage levels with a third exemplary embodiment of the switchgear cell according to the disclosure.

FIG. 3 shows a third exemplary embodiment of the converter circuit according to the disclosure for switching a large number of voltage levels with a third exemplary embodiment of the switchgear cell 1 according to the disclosure, wherein the switching element 1 with a controlled bidirectional current-carrying direction A has one drivable unidirectional power semiconductor switch with a controlled unidirectional current-carrying direction S9 and four unidirectional power semiconductor switches with an uncontrolled unidirectional current-carrying direction D1, D2, D3, D4. In this case, the drivable bidirectional power semiconductor switch with a controlled unidirectional current-carrying direction S9 can be embodied in accordance with the power semiconductor switches S1, S2, S3, S4, S5, S6, S7, S8, as mentioned above. Furthermore, the four unidirectional power semiconductor switches with an uncontrolled unidirectional current-carrying direction D1, D2, D3, D4 are embodied by way of example in each case as diodes which are connected up, in accordance with FIG. 3, to the drivable bidirectional power semiconductor switch with a controlled unidirectional current-carrying direction S9 of the switching element A. The switching element A formed in accordance with FIG. 3 accordingly has only a single drivable bidirectional power semiconductor switch with a controlled unidirectional current-carrying direction S9, whereby the driving outlay is reduced further and a further improvement in the susceptibility to interference is thus established. Furthermore, the switching losses can be reduced.

Figure 4:
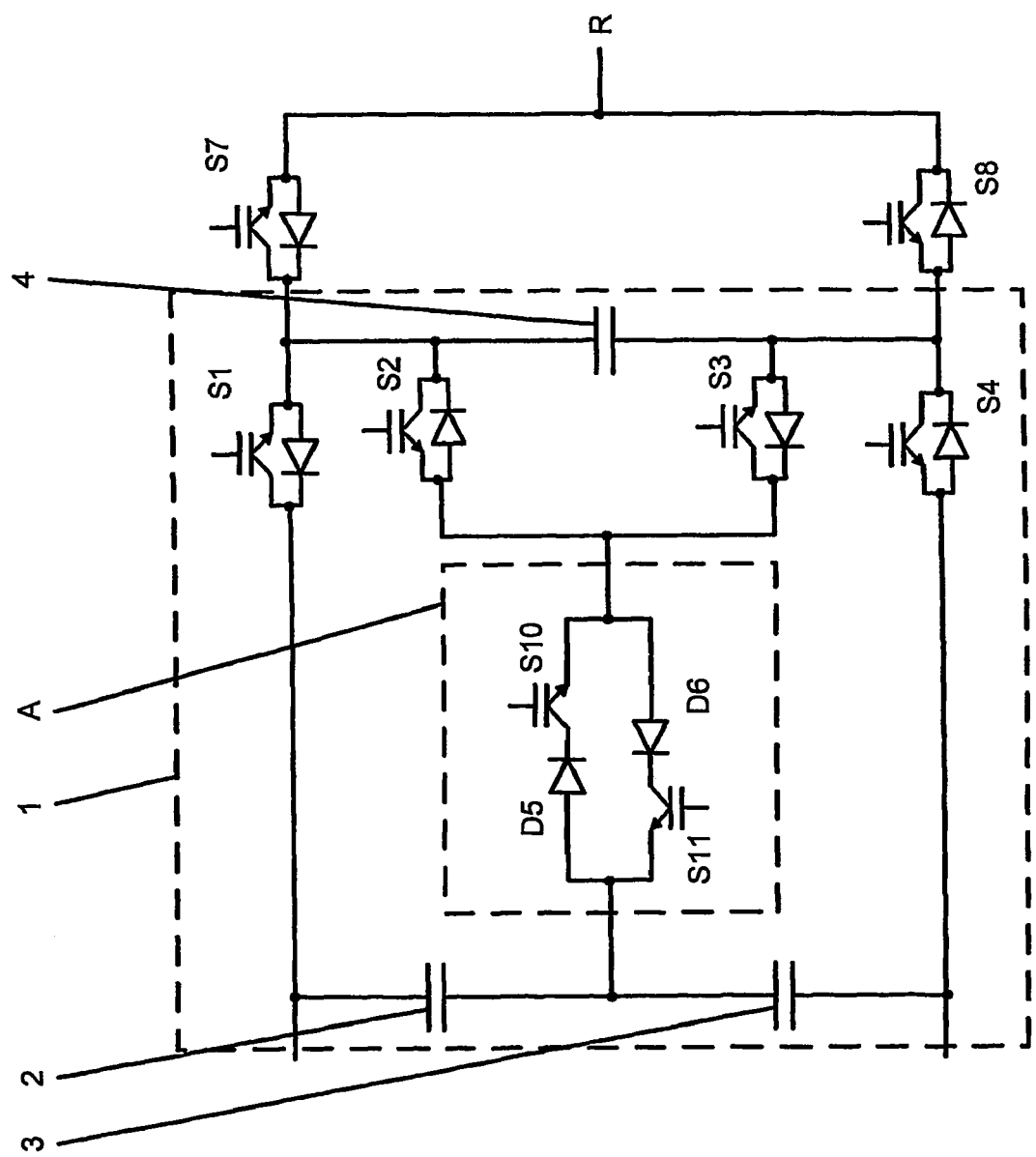
FIG. 4 shows a fourth exemplary embodiment of the converter circuit according to the disclosure for switching a large number of voltage levels with a fourth exemplary embodiment of the switchgear cell according to the disclosure.

FIG. 4 illustrates a fourth exemplary embodiment of the converter circuit according to the disclosure for switching a large number of voltage levels with a fourth exemplary embodiment of the switchgear cell 1 according to the disclosure, wherein the switching element with a controlled bidirectional current-carrying direction A has a first and a second drivable unidirectional power semiconductor switch with a controlled unidirectional current-carrying direction S10, S11 and a first and second unidirectional power semiconductor switch with an uncontrolled unidirectional current-carrying direction D5, D6. In this case, the drivable bidirectional power semiconductor switches with a controlled unidirectional current-carrying direction S10, S11 can be embodied in each case in accordance with the power semiconductor switches S1, S2, S3, S4, S5, S6, S7, S8, S9, as mentioned above. Furthermore, the two unidirectional power semiconductor switches with an uncontrolled unidirectional current-carrying direction D5, D6 are embodied by way of example in each case as diodes. According to FIG. 4, the first drivable unidirectional power semiconductor switch with a controlled unidirectional current-carrying direction S10 of the switching element A and the first unidirectional power semiconductor switch with an uncontrolled unidirectional current-carrying direction D5 of the switching element A are connected inseries. Furthermore, the second drivable unidirectional power semiconductor switch with a controlled unidirectional current-carrying direction S11 of the switching element A and the second unidirectional power semiconductor switch with an uncontrolled unidirectional current-carrying direction D6 of the switching element A are connected inseries. Furthermore, the series circuit formed by the first drivable unidirectional power semiconductor switch with a controlled unidirectional current-carrying direction S10 of the switching element A and the first unidirectional power semiconductor switch with an uncontrolled unidirectional current-carrying direction D5 of the switching element A is connected in antiparallel with the series circuit formed by the second drivable unidirectional power semiconductor switch with a controlled unidirectional current-carrying direction S11 of the switching element A and the second unidirectional power semiconductor switch with an uncontrolled unidirectional current-carrying direction D6 of the switching element A.

Figure 5:
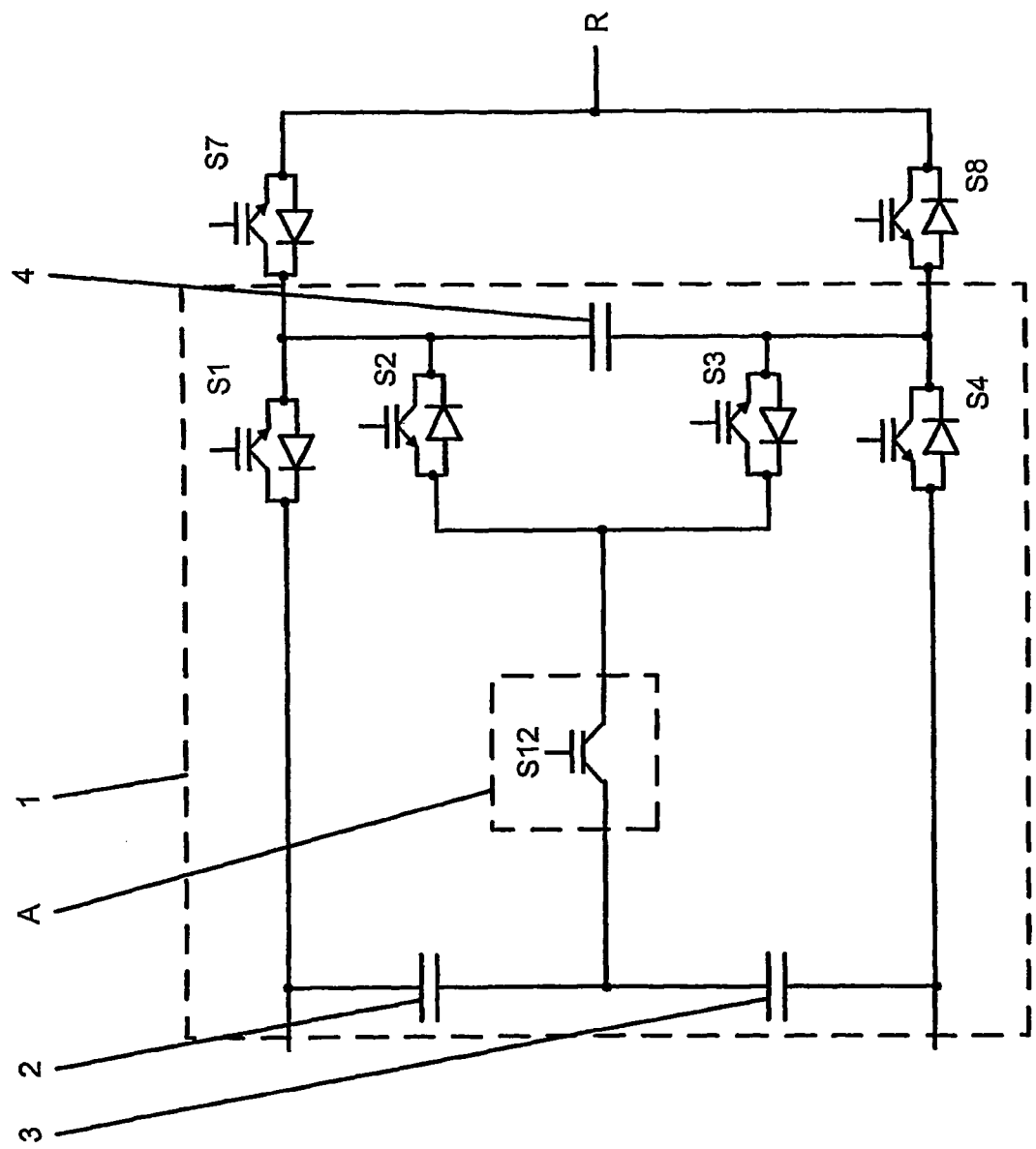
FIG. 5 shows a fifth exemplary embodiment of the converter circuit according to the disclosure for switching a large number of voltage levels with a fifth exemplary embodiment of the switchgear cell according to the disclosure.

In a fifth exemplary embodiment of the converter circuit according to the disclosure for switching a large number of voltage levels in accordance with FIG. 5 with a fifth exemplary embodiment of the switchgear cell 1 according to the disclosure, the switching element with a controlled bidirectional current-carrying direction A has a drivable power semiconductor switch with a controlled bidirectional current-carrying direction S12. The switching element A formed in accordance with FIG. 5 accordingly has only a single drivable bidirectional power semiconductor switch S12, whereby the driving outlay can be reduced further and a further improvement in the susceptibility to interference is thus established. Furthermore, the switching losses can be reduced. Moreover, the on-state losses are advantageously reduced since only a single drivable bidirectional power semiconductor switch S12 is provided in the switching element with a controlled bidirectional current-carrying direction A.

Figure 6:
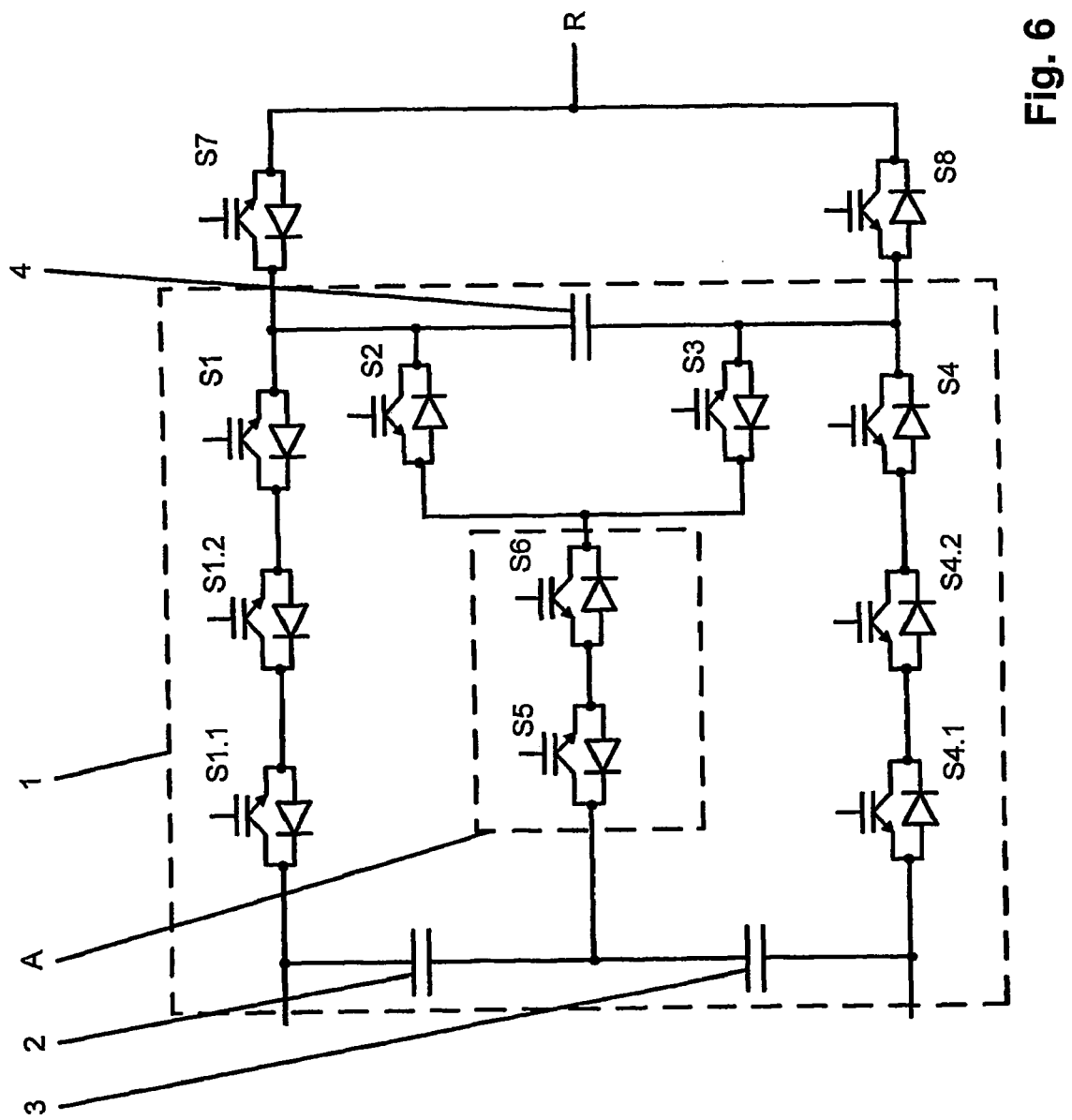
FIG. 6 shows a sixth exemplary embodiment of the converter circuit according to the disclosure for switching a large number of voltage levels with a sixth exemplary embodiment of the switchgear cell according to the disclosure.

FIG. 6 shows a sixth exemplary embodiment of the converter circuit according to the disclosure for switching a large number of voltage levels with a sixth exemplary embodiment of the switchgear cell 1 according to the disclosure. In FIG. 6, in the case of the switchgear cell 1, two further power semiconductor switches S1.1, S1.2 are connected in inseries between the connection of the first power semiconductor switch S1 to the first energy store 2, wherein two further power semiconductor switches S4.1, S4.2 are likewise connected in inseries between the connection of the fourth power semiconductor switch S4 to the second energy store 2. In general, in the case of the switchgear cell 1, at least one further power semiconductor switch S1.1, S1.2 is connected in inseries between the connection of the first power semiconductor switch S1 to the first energy store 2, wherein in addition at least one further power semiconductor switch S4.1, S4.2 is connected in inseries between the connection of the fourth power semiconductor switch S4 to the second energy store 2. Each further power semiconductor switch S1.1, S1.2, S4.1, S4.2 is in each case a drivable bidirectional power semiconductor switch with a controlled unidirectional current-carrying direction. In this case, the further power semiconductor switches S1.1, S1.2, S4.1, S4.2 can be embodied in each case in accordance with the power semiconductor switches S1, S2, S3, S4, S5, S6, S7, S8, S9, S10, S11, as mentioned above. The switching element A is formed in accordance with FIG. 1 or FIG. 2, wherein it is also conceivable, of course, to form the switching element in accordance with FIG. 2a to FIG. 5. If only five voltage levels are switched by means of the converter circuit, all of the power semiconductor switches S1, S1.1, S1.2, S2, S3, S4, S4.1, S4.2, S5, S6, S7, S8 can advantageously be designed for the same blocking voltage. In the case of at least two further power semiconductor switches S1.1, S1.2 connected in inseries between the connection of the first power semiconductor switch S1 to the first energy store 2 and at least two further power semiconductor switches S4.1, S4.2 connected in inseries between the connection of the fourth power semiconductor switch S4 to the second energy store 2, as shown in FIG. 6, the series-connected power semiconductor switches S1.1, S1.2, S4.1, S4.2 can now advantageously be clocked in offset fashion in order to distribute the switching losses better. In the case of just a single further power semiconductor switch S1.1 connected in inseries between the connection of the first power semiconductor switch S1 to the first energy store 2 and just a single further power semiconductor switch S4.1 connected in inseries between the connection of the fourth power semiconductor switch S4 to the second energy store 2, the series-connected power semiconductor switch S1.1, S4.1 can advantageously be designed with double the blocking voltage, wherein said further power semiconductor switches S1.1., S4.1 can then be operated with a lower switching frequency than the first power semiconductor switch S1 of the switchgear cell 1 and, respectively, the fourth power semiconductor switch S4 of the switchgear cell 1, such that the on-state losses of the further power semiconductor switches S1.1, S4.1 can then be kept low overall. By way of example, in this case such a further power semiconductor switch S1.1, S4.1 with double the blocking voltage could be as an integrated thyristor that is commutated via the driving electrode (IGCT—integrated gate-commutated thyristor), or a gate turn-off thyristor (GTO) with in each case an antiparallel-connected diode, wherein the first power semiconductor switch S1 and the fourth power semiconductor switch S4 could then be for example an insulated gate bipolar transistor (IGBT) or a power MOSFET with in each case an antiparallel-connected diode. A cascaded converter system can advantageously be constructed very easily for example by means of the exemplary embodiments of the switchgear cell 1 according to the disclosure according to FIG. 6.

Figure 7:
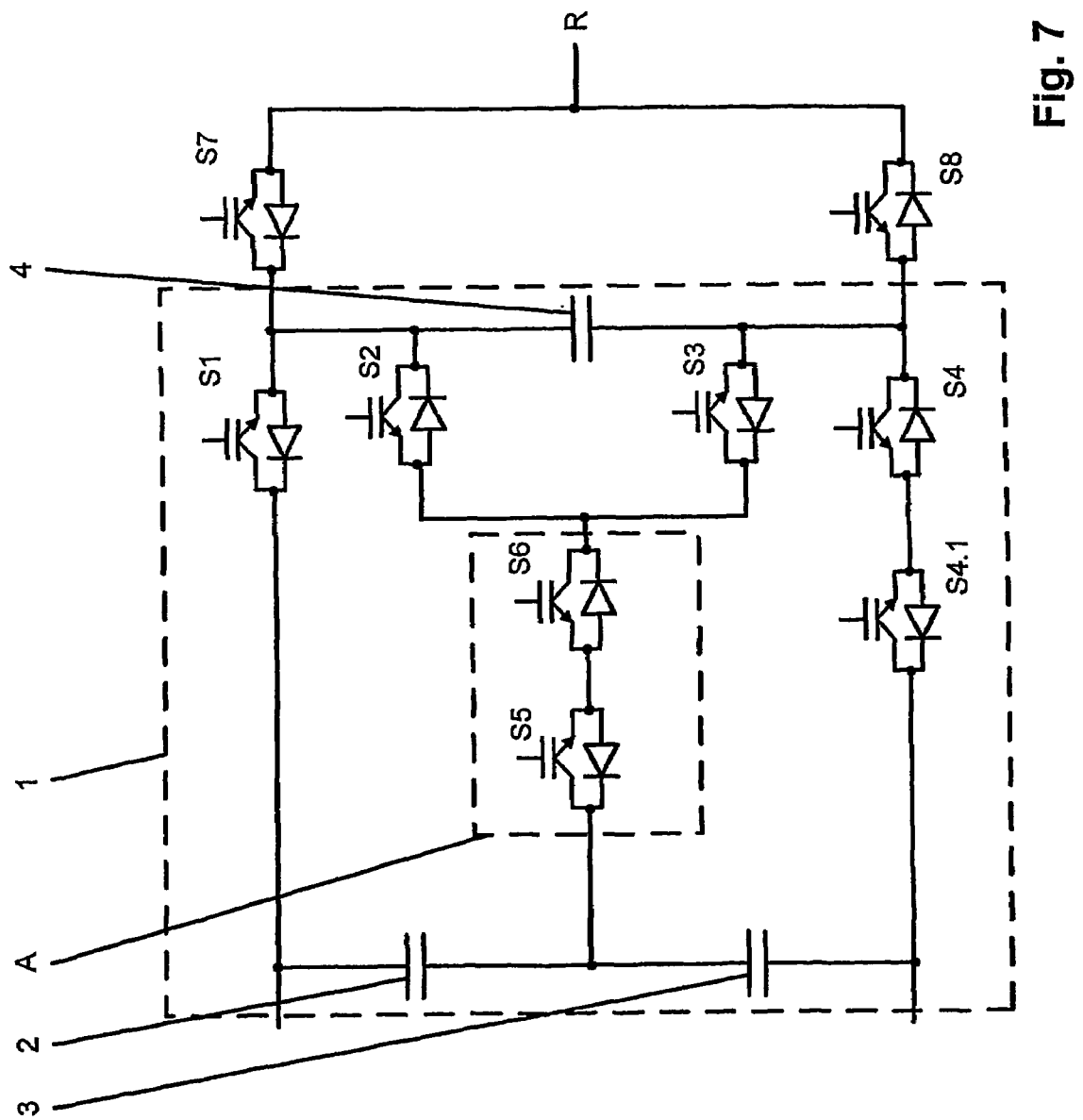
FIG. 7 shows a seventh exemplary embodiment of the converter circuit according to the disclosure for switching a large number of voltage levels with a seventh exemplary embodiment of the switchgear cell according to the disclosure.
Figure 7A:
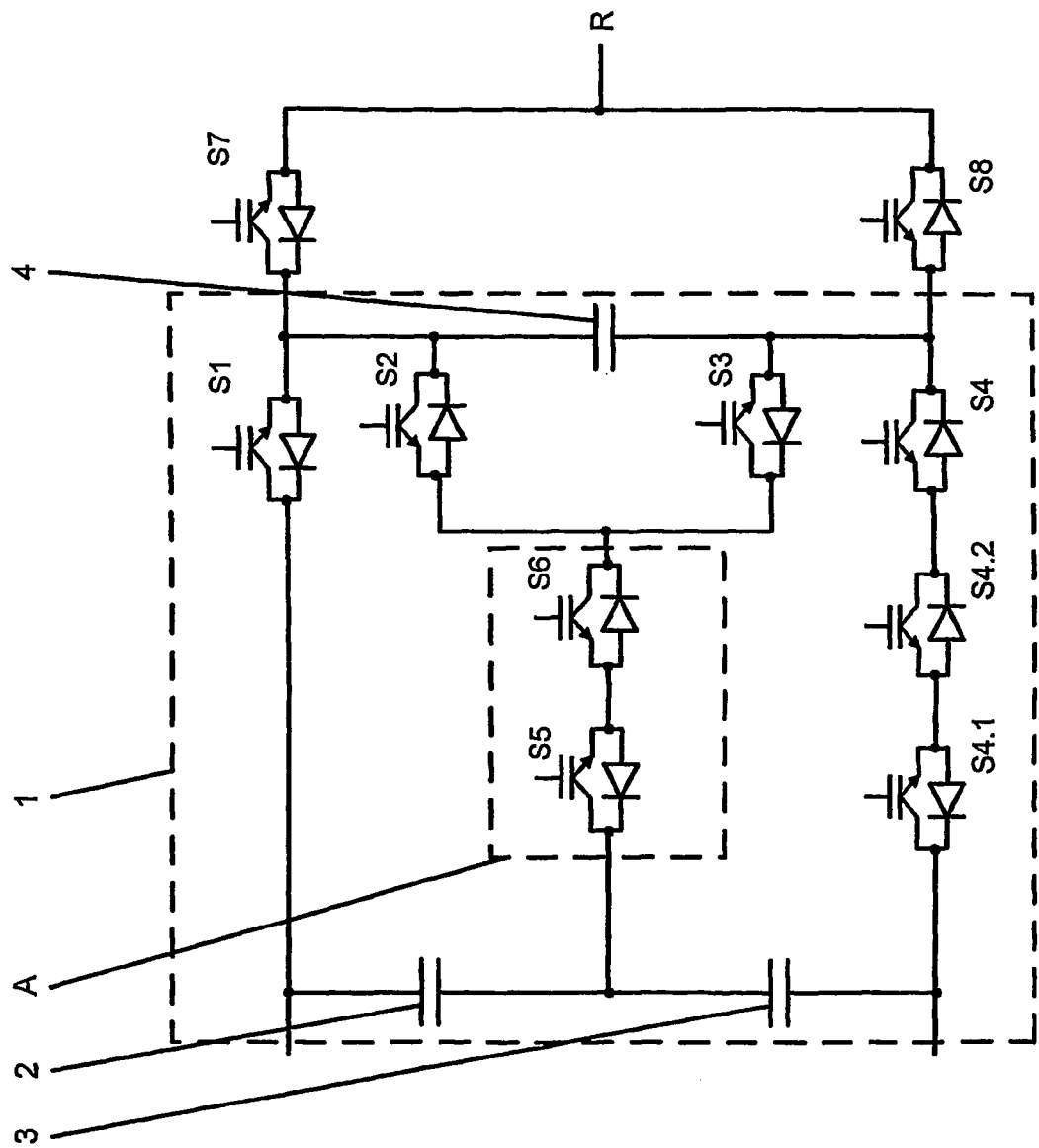
FIG. 7a shows an eighth exemplary embodiment of a converter circuit according to the disclosure for switching a large number of voltage levels with an eighth exemplary embodiment of the switchgear cell according to the disclosure.

FIG. 7 shows a seventh exemplary embodiment of the converter circuit according to the disclosure for switching a large number of voltage levels with a seventh exemplary embodiment of the switchgear cell 1 according to the disclosure. Furthermore, FIG. 7a shows an eighth exemplary embodiment of a converter circuit according to the disclosure for switching a large number of voltage levels with an eighth exemplary embodiment of the switchgear cell 1 according to the disclosure. In general, in the case of the switchgear cell 1 according to FIG. 7 and FIG. 7a, at least one further power semiconductor switch S4.1, S4.2 is connected in between the connection of the fourth power semiconductor switch S4 to the second energy store 3. Each further power semiconductor switch S4.1, S4.2 is in each case a drivable bidirectional power semiconductor switch with a controlled unidirectional current-carrying direction. In this case, the further power semiconductor switches S4.1, S4.2 can be embodied in each case in accordance with the power semiconductor switches S1, S2, S3, S4, S5, S6, S7, S8, S9, S10, S11, as mentioned above. The switching element A is formed according to FIG. 7 and FIG. 7a in accordance with FIG. 1 and FIG. 2, respectively, wherein it is also conceivable, of course, to form the switching element in accordance with FIG. 2a to FIG. 5. In the case of a single further power semiconductor switch S4.1, as shown in FIG. 7, the further power semiconductor switch S4.1 is connected in antiseries with respect to the fourth power semiconductor switch S4. By contrast, in the case of a plurality of further power semiconductor switches S4.1, S4.2, as illustrated in FIG. 7a, at least one further power semiconductor switch S4.1 is connected in antiseries with respect to the fourth power semiconductor switch S4 and at least one further power semiconductor switch S4.2 is connected inseries with respect to the fourth power semiconductor switch S4. A cascaded converter system can likewise advantageously be constructed very easily for example by means of the exemplary embodiments of the switchgear cell 1 according to the disclosure according to FIG. 7 and according to FIG. 7a, respectively.

Figure 8:
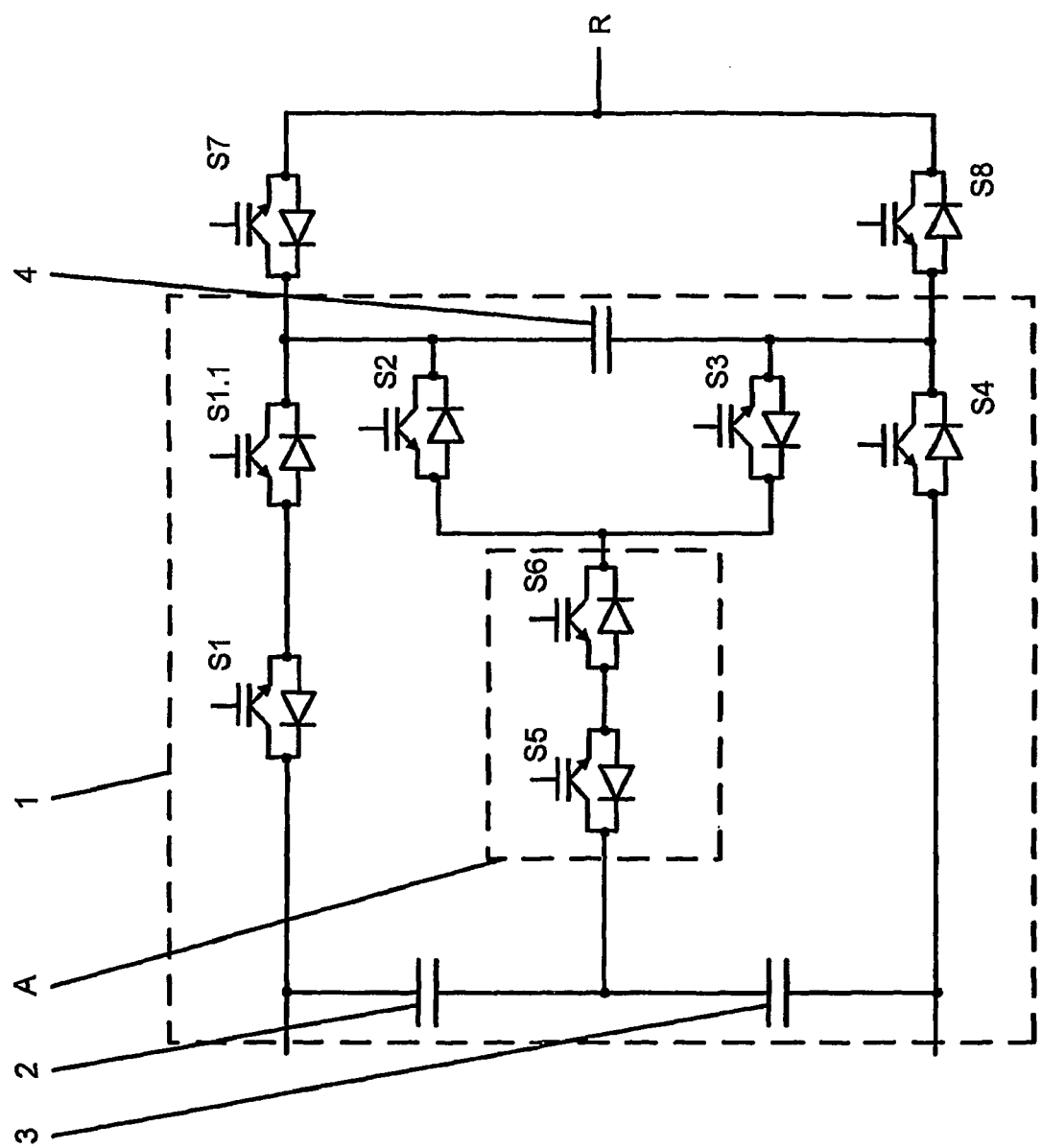
FIG. 8 shows a ninth exemplary embodiment of the converter circuit according to the disclosure for switching a large number of voltage levels with a ninth exemplary embodiment of the switchgear cell according to the disclosure.
Figure 8A:
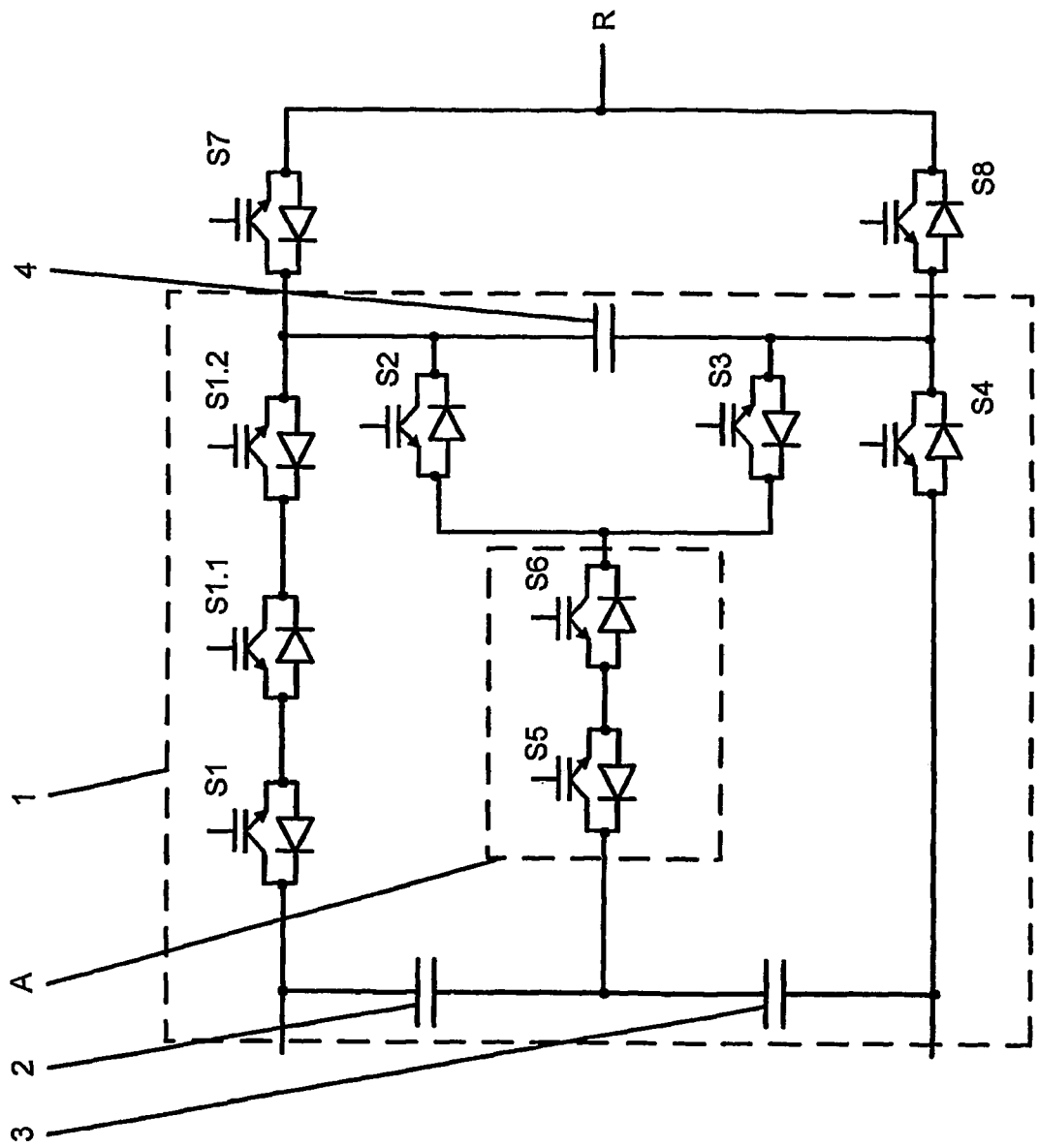
FIG. 8a shows a tenth exemplary embodiment of the converter circuit according to the disclosure for switching a large number of voltage levels with a tenth exemplary embodiment of the switchgear cell according to the disclosure.

FIG. 8 shows a ninth exemplary embodiment of the converter circuit according to the disclosure for switching a large number of voltage levels with a ninth exemplary embodiment of the switchgear cell 1 according to the disclosure. Moreover, FIG. 8a illustrates a tenth exemplary embodiment of the converter circuit according to the disclosure for switching a large number of voltage levels with a tenth exemplary embodiment of the switchgear cell 1 according to the disclosure. In general, in the case of the switchgear cell 1 in accordance with FIG. 8 and FIG. 8a, at least one further power semiconductor switch S1.1, S1.2 is connected in between the connection of the first power semiconductor switch S1 to the second power semiconductor switch S2. Each further power semiconductor switch S1.1, S1.2 is in each case a drivable bidirectional power semiconductor switch with a controlled unidirectional current-carrying direction. In this case, the further power semiconductor switches S1.1, S1.2 can be embodied in each case in accordance with the power semiconductor switches S1, S2, S3, S4, S5, S6, S7, S8, S9, S10, S11, as mentioned above. The switching element A is formed according to FIG. 8 and FIG. 8a in accordance with FIG. 1 and FIG. 2, respectively, wherein it is also conceivable, of course, to form the switching element in accordance with FIG. 2a to FIG. 5. In the case of a single further power semiconductor switch S1.1, as shown in FIG. 8, the further power semiconductor switch S1.1 is connected in antiseries with respect to the first power semiconductor switch S1. By contrast, in the case of a plurality of further power semiconductor switches S1.1, S1.2, as illustrated in FIG. 8a, at least one further power semiconductor switch S1.1 is connected in antiseries with respect to the first power semiconductor switch S1 and at least one further power semiconductor switch S1.2 is connected inseries with respect to the first power semiconductor switch S1. A cascaded converter system can advantageously be constructed very easily for example also by means of the exemplary embodiments of the switchgear cell 1 according to the disclosure according to FIG. 8 and according to FIG. 8a, respectively.

It goes without saying that the person skilled in the art is free to combine all the exemplary embodiments of the switchgear cell 1 according to the disclosure according to FIG. 2 to FIG. 8a or the converter circuit in accordance with FIG. 2 to FIG. 8a also among one another, both singly and multiply to form a converter system.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

| | |
|---|---|
| 1 | Switchgear cell |
| 2 | First energy store |
| 3 | Second energy store |
| 4 | Third energy store |
| A | Switching element of the switchgear cell |
| S1 | First power semiconductor switch of the switchgear cell |
| S2 | Second power semiconductor switch of the switchgear cell |
| S3 | Third power semiconductor switch of the switchgear cell |
| S4 | Fourth power semiconductor switch of the switchgear cell |
| S5 | Drivable power semiconductor switch of the switching element of the switchgear cell |
| S6 | Drivable power semiconductor switch of the switching element of the switchgear cell |
| S7 | First power semiconductor switch of a converter circuit |
| S8 | Second power semiconductor switch of the converter circuit |
| S9 | Drivable power semiconductor switch of the switching element of the switchgear cell |
| S10 | Drivable power semiconductor switch of the switching element of the switchgear cell |
| S11 | Drivable power semiconductor switch of the switching element of the switchgear cell |
| S12 | Drivable power semiconductor switch of the switching element of the switchgear cell |
| D1, D2, D3, D4, D5, D6 | Power semiconductor switches of the switching element of the switchgear cell |

What is claimed is:

1. A switchgear cell having a first energy store and a second energy store connected in series therewith,
having a first, second, third and fourth power semiconductor switch, wherein the first, second, third and fourth power semiconductor switch are in each case a drivable bidirectional power semiconductor switch with a controlled unidirectional current-carrying direction and the first, second, third and fourth power semiconductor switch are connected in series and the first power semiconductor switch is connected to the first energy store and the fourth power semiconductor switch is connected to the second energy store,
having a third energy store, which is connected to the junction point between the first power semiconductor switch and the second power semiconductor switch and to the junction point between the third power semiconductor switch and the fourth power semiconductor switch, wherein
a switching element with a controlled bidirectional current-carrying direction is connected directly to the junction point between the second and the third power semiconductor switch and directly to the junction point between the first energy store and the second energy store.

2. The switchgear cell as claimed in claim 1, wherein the switching element with a controlled bidirectional current-carrying direction has two antiseries-connected drivable bidirectional power semiconductor switches with a controlled unidirectional current-carrying direction.

3. The switchgear cell as claimed in claim 1, wherein the switching element with a controlled bidirectional current-carrying direction has one drivable unidirectional power semiconductor switch with a controlled unidirectional current-carrying direction and four unidirectional power semiconductor switches with an uncontrolled unidirectional current-carrying direction.

4. The switchgear cell as claimed in claim 1, wherein the switching element with a controlled bidirectional current-carrying direction has a first and a second drivable unidirectional power semiconductor switch with a controlled unidirectional current-carrying direction and a first and a second unidirectional power semiconductor switch with an uncontrolled unidirectional current-carrying direction.

5. The switchgear cell as claimed in claim 4, wherein the first drivable unidirectional power semiconductor switch with a controlled unidirectional current-carrying direction of the switching element and the first unidirectional power semiconductor switch with an uncontrolled unidirectional current-carrying direction of the switching element are connected in series,
wherein the second drivable unidirectional power semiconductor switch with a controlled unidirectional current-carrying direction of the switching element and the second unidirectional power semiconductor switch with an uncontrolled unidirectional current-carrying direction of the switching element are connected in series, and
wherein the series circuit formed by the first drivable unidirectional power semiconductor switch with a controlled unidirectional current-carrying direction of the switching element and the first unidirectional power semiconductor switch with an uncontrolled unidirectional current-carrying direction of the switching element is connected in antiparallel with the series circuit formed by the second drivable unidirectional power semiconductor switch with a controlled unidirectional current-carrying direction of the switching element and the second unidirectional power semiconductor switch with an uncontrolled unidirectional current-carrying direction of the switching element.

6. The switchgear cell as claimed in claim 1, wherein the switching element with a controlled bidirectional current-carrying direction has a drivable power semiconductor switch with a controlled bidirectional current-carrying direction.

7. The switchgear cell as claimed in claim 1, wherein at least one further power semiconductor switch is connected in inseries between the connection of the first power semiconductor switch to the first energy store, and
wherein at least one further power semiconductor switch is connected in inseries between the connection of the fourth power semiconductor switch to the second energy store, wherein each further power semiconductor switch is in each case a drivable bidirectional power semiconductor switch with a controlled unidirectional current-carrying direction.

8. The switchgear cell as claimed in claim 1, wherein at least one further power semiconductor switch is connected in between the connection of the fourth power semiconductor switch to the second energy store wherein each further power semiconductor switch is in each case a drivable bidirectional power semiconductor switch with a controlled unidirectional current-carrying direction.

9. The switchgear cell as claimed in claim 8, wherein, in the case of a single further power semiconductor switch, the further power semiconductor switch is connected in antiseries with respect to the fourth power semiconductor switch.

10. The switchgear cell as claimed in claim 8, wherein, in the case of the plurality of further power semiconductor switches, at least one further power semiconductor switch is connected in antiseries with respect to the fourth power semiconductor switch and at least one further power semiconductor switch is connected in series with respect to the fourth power semiconductor switch.

11. The switchgear cell as claimed in claim 1, wherein at least one further power semiconductor switch is connected in between the connection of the first power semiconductor switch to the second power semiconductor switch, wherein each further power semiconductor switch is in each case a drivable bidirectional power semiconductor switch with a controlled unidirectional current-carrying direction.

12. The switchgear cell as claimed in claim 11, wherein, in the case of a single further power semiconductor switch, the further power semiconductor switch is connected in antiseries with respect to the first power semiconductor switch.

13. The switchgear cell as claimed in claim 11, wherein, in the case of a plurality of further power semiconductor switches, at least one further power semiconductor switch, is connected in antiseries with respect to the first power semiconductor switch and at least one further power semiconductor switch is connected in series with respect to the first power semiconductor switch.

14. A converter circuit for switching a large number of voltage levels having a first power semiconductor switch and a second power semiconductor switch connected in series with the first power semiconductor switch, wherein
a switchgear cell as claimed in claim 1 is connected to the first power semiconductor switch of the converter circuit and to the second power semiconductor switch of the converter circuit.

15. The converter circuit as claimed in claim 14, wherein the first power semiconductor switch of the converter circuit is connected to the junction point between the first power semiconductor switch of the switchgear cell and the second power semiconductor switch of the switchgear cell, and wherein the second power semiconductor switch of the converter circuit is connected to the junction point between the third power semiconductor switch of the switchgear cell and the fourth power semiconductor switch of the switchgear cell.

16. The converter circuit as claimed in claim 14, wherein the first and second power semiconductor switch of the converter circuit are in each case a drivable bidirectional power semiconductor switch with a controlled unidirectional current-carrying direction.

17. The switchgear cell as claimed in claim 6, wherein at least one further power semiconductor switch is connected in inseries between the connection of the first power semiconductor switch (S1) to the first energy store, and wherein at least one further power semiconductor switch is connected in inseries between the connection of the fourth power semiconductor switch to the second energy store, wherein each further power semiconductor switch is in each case a drivable bidirectional power semiconductor switch with a controlled unidirectional current-carrying direction.

18. The switchgear cell as claimed in claim 6, wherein at least one further power semiconductor switch is connected in between the connection of the fourth power semiconductor switch to the second energy store wherein each further power semiconductor switch is in each case a drivable bidirectional power semiconductor switch with a controlled unidirectional current-carrying direction.

19. The switchgear cell as claimed in claim 6, wherein at least one further power semiconductor switch is connected in between the connection of the first power semiconductor switch to the second power semiconductor switch, wherein each further power semiconductor switch is in each case a drivable bidirectional power semiconductor switch with a controlled unidirectional current-carrying direction.

20. A converter circuit for switching a large number of voltage levels having a first power semiconductor switch and a second power semiconductor switch connected in series with the first power semiconductor switch, wherein a switchgear cell as claimed in claim 13 is connected to the first power semiconductor switch of the converter circuit and to the second power semiconductor switch of the converter circuit.

21. The converter circuit as claimed in claim 15, wherein the first and second power semiconductor switch of the converter circuit are in each case a drivable bidirectional power semiconductor switch with a controlled unidirectional current-carrying direction.

22. A converter circuit arrangement for switching a large number of voltage levels comprising:
a first power semiconductor switch;
a second power semiconductor switch connected in series with the first power semiconductor switch;
a third power semiconductor switch;
a fourth power semiconductor switch;
a switchgear cell connected to the first power semiconductor switch of the converter circuit and to the second power semiconductor switch of the converter circuit, the switchgear cell having a first energy store and a second energy store connected in series therewith; and
a switching element with a controlled bidirectional current-carrying direction is connected directly to the junction point between the second and the third power semiconductor switch and directly to the junction point between the first energy store and the second energy store;
wherein the first, second, third and fourth power semiconductor switch are in each case a drivable bidirectional power semiconductor switch with a controlled unidirectional current-carrying direction and the first, second, third and fourth power semiconductor switch are connected in series and the first power semiconductor switch is connected to the first energy store and the fourth power semiconductor switch is connected to the second energy store; and
having a third energy store, which is connected to the junction point between the first power semiconductor switch and the second power semiconductor switch and to the junction point between the third power semiconductor switch and the fourth power semiconductor switch.

* * * * *